Patented Sept. 18, 1923.

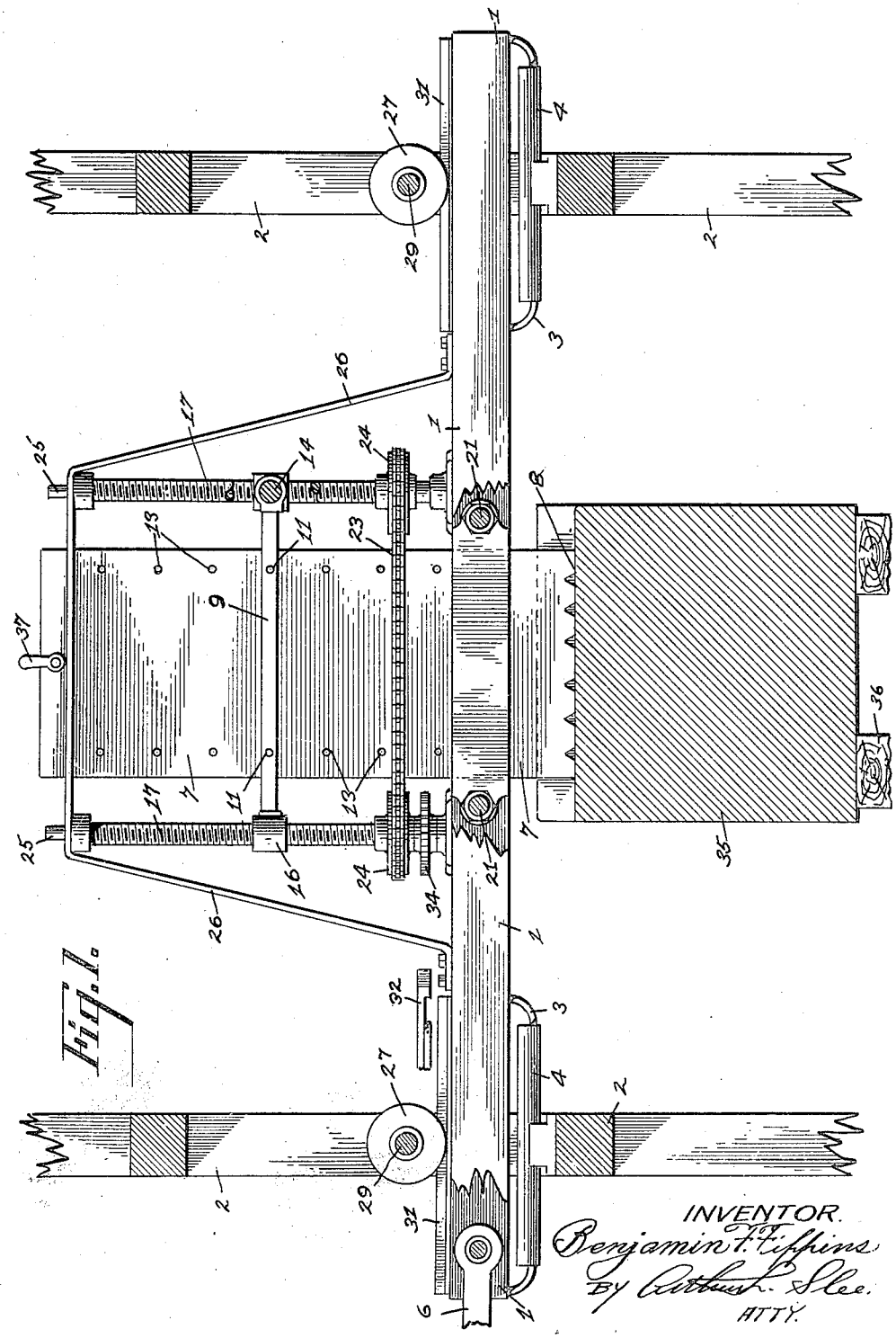

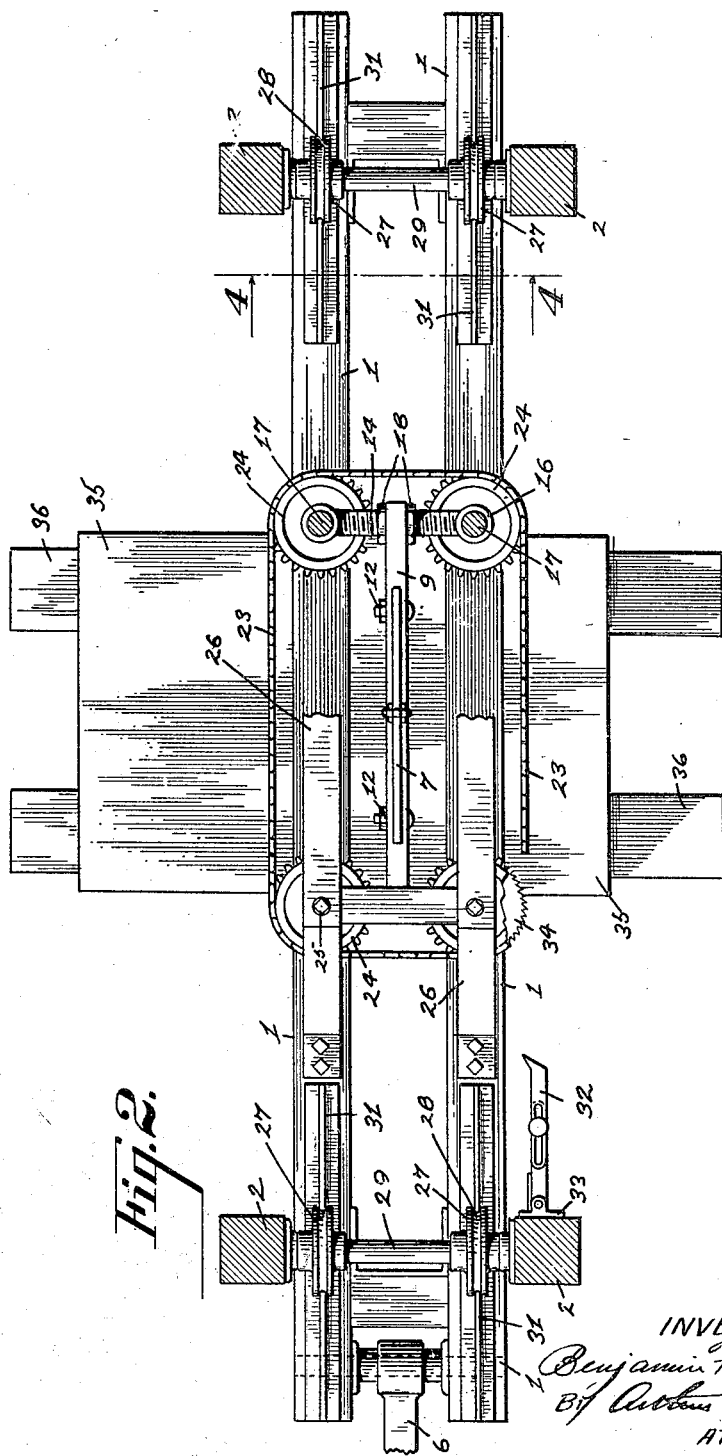

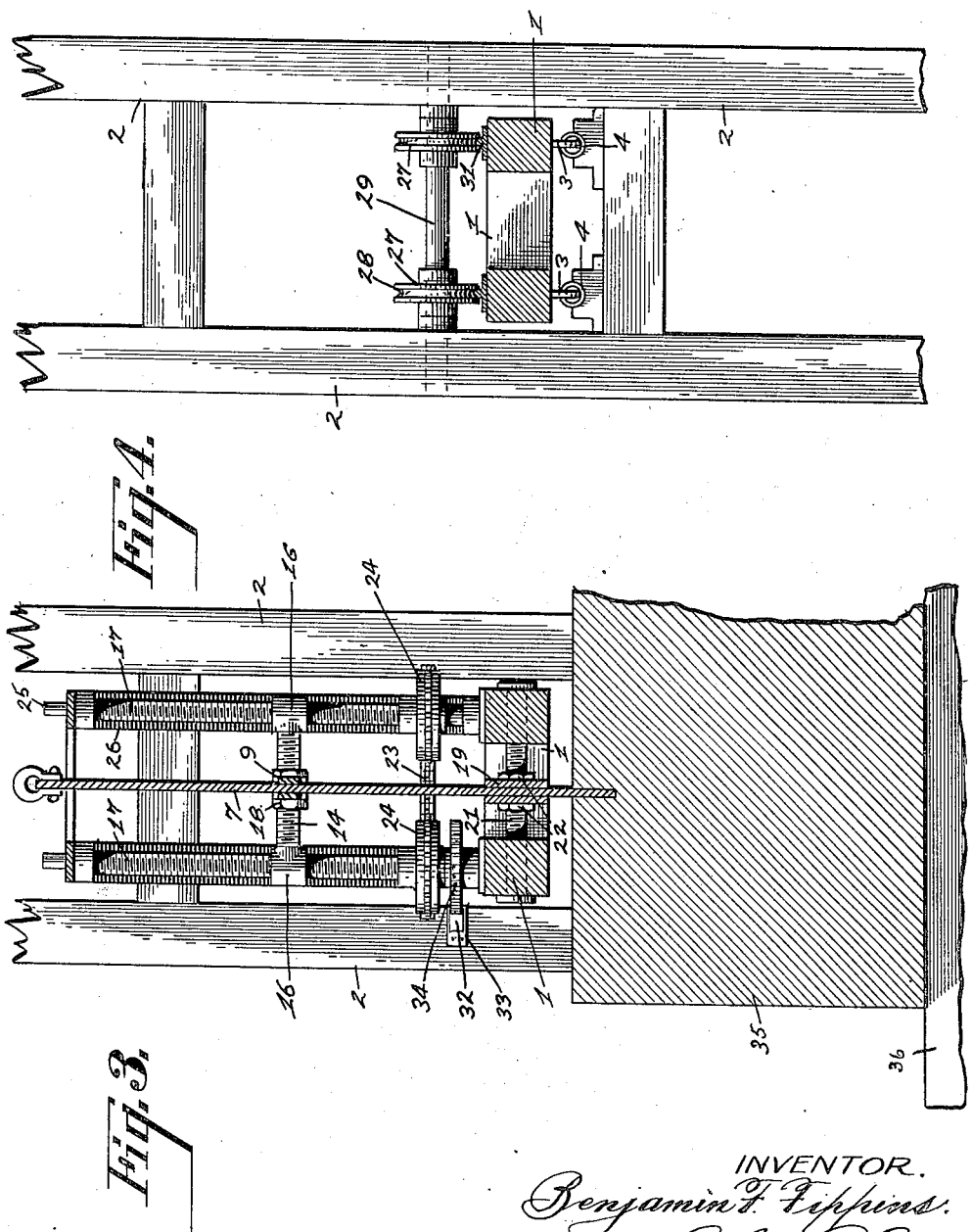

1,468,104

UNITED STATES PATENT OFFICE.

BENJAMIN F. FIPPINS, OF SAN FRANCISCO, CALIFORNIA, ASSIGNOR OF ONE-HALF TO THOMAS L. BOCCI, OF COLMA, CALIFORNIA.

SAWING MACHINE.

Application filed January 16, 1922. Serial No. 529,739.

*To all whom it may concern:*

Be it known that I, BENJAMIN F. FIPPINS, a citizen of the United States, residing in the city and county of San Francisco and State of California, have invented a new and useful Improvement in a Sawing Machine, of which the following is a specification.

My invention relates to improvements in power operated saws for cutting granite and other highly resistant materials, the primary object being to provide an improved saw arranged to be reciprocated under pressure against material to be sawed to obtain a maximum cutting effect with a minimum consumption of power.

Another object is to provide improved means for feeding the saw to automatically maintain the saw in engagement with the material to be sawed and to create the desired pressure thereagainst to minimize the attention required during a sawing operation.

A further object is to provide an improved carriage mounting adapted to reduce friction between the carriage and its supports whereby a greater portion of the energy delivered thereto may be directed to the actual sawing operation.

A still further object is to provide an improved construction and arrangement of parts adapted to facilitate the positioning and adjustment of the saw relative to the carriage and to the work, and to prevent displacement of the saw while in operation.

I accomplish these and other objects by means of the device disclosed in the drawings forming a part of the present specification wherein like characters of reference are used to designate similar parts throughout said specification and drawings and in which:

Fig. 1 is a broken side elevation partly in section of my improved saw.

Fig. 2 is a broken plan view, parts being broken away and shown in section.

Fig. 3 is a transverse section.

Fig. 4 is a section taken upon the line 4—4 of Fig. 2 in the direction indicated.

Referring to the drawings the numeral 1 is used to designate in general a carriage slidably mounted upon a supporting frame 2 by means of runners 3 engaging guides 4. The carriage 1 is preferably arranged to be reciprocated in a horizontal plane by means of a connecting rod 6 suitably connected between one end of the carriage and a source of power, not shown.

A saw 7 having a cutting edge 8 at the bottom thereof is secured in vertical position upon the carriage, the upper portion of the saw being received within a slot formed in a longitudinally disposed saw engaging member 9 having apertures 11 therethrough to receive pins 12 engaging said apertures and corresponding apertures 13 formed in the saw 7. The apertures 13 are formed in a plurality of vertically spaced pairs whereby the saw may be adjusted vertically relative to the saw engaging member 9 by moving any desired pair of apertures 13 to a position matching with the apertures 11.

The saw engaging member 9 is slidably mounted upon threaded transverse members 14, the ends of which are engaged by followers 16 threaded upon vertically disposed threaded shafts 17 rotatably mounted upon the carriage 1. Nuts 18 are threaded upon the transverse members 14 to engage the sides of the member 9 whereby said member may be adjusted laterally with respect to the carriage, the nuts upon one side of the member 8 being moved to a desired position and the nuts upon the other side being subsequently moved to secure the member 9 against the first mentioned nuts.

The lower portion of the saw 7 is engaged by a member 19 slidably mounted upon transverse threaded members 21 secured between the sides of the carriage 1 and provided with nuts 22 to engage the sides of the member 19 to permit adjustment thereof to conform to the adjustment of the upper saw engaging member 9 and maintain the saw in a vertical plane parallel with the sides of the carriage.

The upper transverse members 14 connected between followers 16 upon the threaded shafts 17 upon opposite sides of the carriage are positioned within the same horizontal plane and are arranged to be moved simultaneously by means of an endless chain 23 engaging sprockets 24 secured upon the lower portions of the shafts whereby a rotation of one shaft will cause a similar movement of the other shafts. In this manner, the transverse members 14, and consequently the saw engaging member 9 and the saw 7 may be moved vertically relative to the frame by a rotation of the shafts 17 causing the followers 16 to be advanced or receded along said shafts, the lower portion of the saw being slidably engaged by the lower saw receiving member 19.

Braces 26 are shaped to have their ends secured upon the carriage 1 and to engage the upper ends of the shafts 17 to hold said shafts in vertical position. The upper ends of the shafts are provided with squared ends 25 whereby the shafts may be turned manually by means of any suitable wrench if desired.

Rollers 27 having grooves 28 formed in the periphery thereof are rotatably mounted upon horizontally disposed shafts 29 mounted upon the frame 2 immediatly above the ends of the carriage 1, the grooves 28 being arranged to engage rails 31 secured upon the tops of the side pieces of said carriage at the ends thereof.

A pawl 32 is adjustably mounted upon a bracket 33 secured upon the frame 2 in alignment a ratchet 34 secured upon one of the shafts 17 in such manner than when the carriage is reciprocated the ratchet will be engaged and shaft partially rotated thereby when the carriage is moved to its extreme position during each reciprocation.

The operation of my improved saw is as follows: A block of granite 35 or other material to be sawed is positioned upon any suitable support 36 beneath the saw 7, the saw and the block being adjusted to cause the cutting edge 8 of the saw to engage the granite along the line defining the desired cut. In beginning work, the followers 16 are moved to occupy positions well upon the shafts 17, and the saw adjusted vertically to bring the cutting edge 8 to approximately the desired height by removing the pins 12 and reinserting when the desired pair of apertures 13 have been caused to match with the aperture 11 of the member 9. The shaft 17 may now be rotated manually either by a wrench applied to the squared end 25 of one of the shafts, or by a manual movement of the chain 23 to move the followers downwardly to bring the cutting edge 8 of the saw into contact with the surface of the block to be cut.

Power is now applied through the connecting rod 6 to reciprocate the carriage, the saw being thus moved back and forth across the surface of the material to be sawed thereby causing the portion directly under the cutting edge of the saw to be cut away. At each reciprocation of the carriage, the ratchet 34 is moved into contact with the pawl 32 at the moment the carriage is approaching the end of the stroke, and a partial rotation of said ratchet and the shafts 17 will thereby be caused, said rotation of the shafts operating to move the followers 16 downwardly and thus feed the saw into the cut made by the cutting edge. The amount of the rotation may be varied to suit the requirements of materials of different character and degree of hardness by adjusting the pawl 32 to engage the ratchet 34 during a greater or lesser portion of the movement of the carriage as desired.

As the material for which my improved saw is particularly designed is of a highly resistent character, it is necessary that relatively great pressure be applied upon the saw in order that the material may be more quickly and effectively cut by the saw. The automatic feeding of the saw by means of the followers may be adjusted to cause such pressure to be applied, but as the pressure thus caused will have a tendency to lift the carriage and the saw, I have provided the rollers 27 engaging the top of the carriage. The rollers receive the upward thrust due to the pressure of the saw against the material being sawed and by forming a rolling contact with the carriage permit the carriage and the saw to be reciprocated with a minimum of waste energy used in overcoming friction against the carriage mounting, the energy thus saved permitting the pressure upon the saw to be correspondingly increased.

The saw is preferably made from heavy sheet metal to withstand the heavy duty imposed upon it. A clevis 37 is mounted upon the top of the saw by which the saw may be moved in making adjustment. Chilled shot and water are continuously applied below the cutting edge, such shot being held within the serrations formed upon the edge of the saw to increase the cutting effect thereof, as in the present state of the art, no specific means of feeding said shot and water being shown in the drawings.

By moving the saw 7 to the extreme position of lateral adjustment it is possible to mount a similar jaw parallel thereto and thus accomplish the making of two cuts simultaneously if desired.

As best shown in Fig. 1 of the drawings, the saw is maintained with its cutting edge in a horizontal plane at all times thus making a cut of uniform depth throughout. This is important as it permits small blocks of regular shape to be cut from larger blocks without unnecessary waste of material such as occasioned by allowing for a difference in depth.

From the above description it is seen that I have provided a machine adapted to efficiently perform the heavy duty required in cutting granite and similar materials. By providing for the automatic feeding of the saw, a minimum of attention is required, as after the saw is set and sawing begun the operator is free to attend to other duties during the period of time required for making the cut, which in the case of granite and materials of like resistance to cutting is of considerable duration.

Having thus described my invention what I claim as new and desire to secure by Letters Patent is:

1. A saw for cutting granite and the like comprising a carriage; a plurality of threaded shafts rotatably mounted upon the carriage and extending laterally therefrom; a saw engaging element threaded upon said shafts; a saw adjustably secured upon said engaging element; means for adjusting the saw engaging element and the saw laterally with respect to the carriage; means for reciprocating the carriage; and means actuated at each reciprocation of the carriage for partially rotating the shaft whereby the saw is advanced a predetermined amount at each reciprocation to automatically maintain engagement with the material to be sawed.

2. In a saw for cutting granite and the like, the combination with a reciprocating carriage, of a plurality of threaded shafts rotatably mounted in pairs upon the carriage; transverse members threaded upon said pairs of shafts; and a saw engaging element adjustably mounted upon said transverse members to receive a saw.

3. In a saw for cutting granite and the like, the combination with a reciprocating carriage, of a plurality of threaded shafts rotatably mounted in pairs upon the carriage; transverse members threaded upon said pairs of shafts; a saw engaging element adjustably mounted upon said transverse members to receive a saw; and means for rotating the shafts simultaneously to move the transverse members and the saw relatively to said shafts.

4. In a saw for cutting granite and the like, the combination with a reciprocating carriage, of a plurality of threaded shafts rotatably mounted in pairs upon the carriage; transverse members threaded upon said pairs of shafts; a saw engaging element adjustably mounted upon said transverse members to receive a saw; an endless chain engaging said sprockets whereby a rotation of one shaft will operate to rotate the other shafts a similar amount; and a pawl and ratchet mounted in connection with one of the shafts to partially turn said shafts at each reciprocation of the carriage.

5. In a saw for cutting granite and the like, the combination with a reciprocating carriage, of a plurality of threaded shafts rotatably mounted in pairs upon the carriage; transverse members extending between each pair of shafts, and engaging the threads thereon; a saw engaging element adjustably mounted between the transverse members; sprockets secured upon the shafts; an endless chain mounted about said sprockets whereby a rotation of one shaft will impart a similar rotation of the remaining shafts; a ratchet mounted upon one of the shafts; and an adjustable pawl mounted adjacent the ratchet to engage the same to automatically turn the shafts a predetermined amount at each reciprocation of the carriage.

In witness whereof I hereunto set my signature.

BENJAMIN F. FIPPINS.